United States Patent [19]

Fleming et al.

[11] Patent Number: 5,337,977
[45] Date of Patent: Aug. 16, 1994

[54] VENT-LATCH INTERLOCK ASSEMBLY FOR AN AIRCRAFT DOOR

[75] Inventors: Michael A. Fleming, Bellevue; Michael C. Sturm, Redmond, both of Wash.

[73] Assignee: The Boeing Company, Seattle, Wash.

[21] Appl. No.: 11,307

[22] Filed: Jan. 29, 1993

[51] Int. Cl.⁵ .............................................. B64C 1/14
[52] U.S. Cl. ........................... 244/129.5; 49/278
[58] Field of Search ........................ 244/129.4, 129.5; 49/276, 278

[56] References Cited

U.S. PATENT DOCUMENTS

| | | | |
|---|---|---|---|
| 2,748,855 | 6/1956 | Siems et al. | 244/129.5 |
| 2,774,116 | 12/1956 | Wolverton | 49/21 |
| 2,882,115 | 4/1959 | Lindenschmidt | 49/21 |
| 3,004,303 | 10/1961 | Wilmer | 244/129.5 |
| 3,051,280 | 8/1962 | Bergman et al. | 244/129.5 |
| 3,085,297 | 4/1963 | Linderfelt | 49/276 |
| 4,042,193 | 8/1977 | Cerne | 244/129.5 |
| 4,552,326 | 11/1985 | Bokalot | 244/129.5 |
| 4,720,065 | 1/1988 | Hamatani | 244/129.5 |
| 4,758,030 | 7/1988 | Kupfernagel | 244/129.4 |
| 4,944,473 | 7/1990 | Kallies et al. | 244/129.5 |
| 5,156,359 | 10/1992 | Noble et al. | 244/129.4 |
| 5,163,639 | 11/1992 | Herrmann et al. | 244/129.5 |

*Primary Examiner*—Michael S. Huppert
*Assistant Examiner*—Virna Lissi Ansley
*Attorney, Agent, or Firm*—Christensen, O'Connor, Johnson & Kindness

[57] ABSTRACT

A vent-latch interlock assembly (22) for installation to an aircraft door (20) that is provided with a latch assembly (32) that controls the opening and closing of the aircraft door. The vent-latch interlock assembly includes a pressure vent door (40) that is positioned to be seated in an opening (42) formed in the aircraft door (20). The pressure vent door (40) is rotatably attached to a shaft (44) that is rotatably mounted to the aircraft door (20). A set of springs (68) normally biases the pressure vent door (40) away from the opening (42). A drive rod (45) connected between the latch assembly (32) and the shaft holds the pressure vent door (40) in the closed position when the aircraft door (20) is closed. An interlock cable (46) is connected between the pressure vent door and an interlock follower (48) and is located next to the latch assembly (32). When the pressure vent door (40) is closed, the interlock cable forces the interlock follower against the latch assembly (32) to prevent actuation of the latch assembly and opening of the aircraft door (20). When the latch assembly (32) is actuated to open the door, the drive rod (45) releases its force against the pressure vent door (40). If the pressures inside and outside of the aircraft are approximately equal, the springs (68) will pivot the pressure vent door (40) open. This causes the interlock cable (46) to release the tension on the interlock follower (48) so that the follower moves away from the latch assembly (32) and the latch assembly can continue to be actuated in order to open the aircraft door (20).

32 Claims, 8 Drawing Sheets fig.3.

VENT-LATCH INTERLOCK ASSEMBLY FOR AN AIRCRAFT DOOR

FIELD OF THE INVENTION

This invention relates generally to aircraft doors and, more specifically, to a vent-latch interlock assembly that can be installed in a cabin door of an aircraft.

BACKGROUND OF THE INVENTION

The doors of modern commercial aircraft are often provided with vent-latch interlock assemblies. A typical vent-latch interlock assembly includes a small pressure vent door that is seated in an opening formed in the aircraft door. A drive linkage is connected between the pressure vent door and a latch assembly that controls the opening, closing, and locking of the aircraft door. The drive linkage is arranged so that it will not close the pressure vent door until the associated aircraft door is latched and locked. Consequently, in the event the aircraft door is not properly closed, the open pressure vent door prevents the aircraft from being pressurized and thus requires aircraft personnel to take note that there is a problem with the door that requires attention. Moreover, a typical drive linkage is arranged so that, before the latch assembly is actuated to open the aircraft door, the pressure vent door is initially opened. The pressure vent door and the drive linkage are further constructed so that, when the aircraft cabin pressure is greater than the ambient pressure, the pressure vent door will not open and the drive linkage will not move. Since the drive linkage is integrally connected to the latch assembly, this "lockout" of the drive linkage prevents the actuation of the latch assembly and, thus, the unlocking and opening of the aircraft door. Thus, a pressure vent door assembly is well suited for installation to an aircraft cabin door to prevent the door from being opened while the aircraft is in pressurized flight. The pressure vent door and the drive linkage are further configured so that, in the event the ambient pressure is substantially greater than the aircraft cabin pressure, the pressure vent door will open. This allows air to bleed into the aircraft to reduce the pressure differential between the inside of the aircraft and the ambient environment. The minimization of this pressure differential reduces the force imposed on the aircraft by the surrounding atmosphere.

While current vent-latch interlock assemblies have proved useful, they are not without limitations. Sometimes when an aircraft lands, the pressure vent door is covered with ice and sealed in place. Many vent-latch interlock assemblies do not include a mechanism for breaking the pressure vent door free of the ice. Consequently, when the latch assembly is actuated to unlock and open the door, the pressure vent door remains closed. Since the pressure vent door will not open, the drive linkage locks out movement of the latch assembly and prevents the opening of the aircraft door.

Furthermore, often a vent-latch interlock assembly is constructed so that it locks out the movement of the door latch assembly only if the aircraft cabin pressure is significantly greater than the ambient pressure. If the cabin pressure is only slightly greater than the ambient pressure, the vent-latch interlock assembly will still allow the latch assembly to be actuated so that the door can be opened. Sometimes, if the aircraft cabin remains pressurized after the aircraft has landed, there can be a small pressure differential between the inside and outside of the aircraft. If the vent-latch interlock assembly does not prevent the latch assembly from being actuated, when the aircraft door is unlocked, the slightly higher cabin pressure may three the aircraft door rapidly outward. This rapid movement of the door has the potential to injure ground personnel, such as ramp attendants, who are standing outside of the aircraft.

SUMMARY OF THE INVENTION

This invention relates generally to a vent-latch interlock system for an aircraft door. More particularly, this invention is related to a vent-latch interlock assembly with a pressure vent door capable of breaking away from an ice seal that may form around the opening in which the pressure vent door is seated. The vent-latch interlock assembly of this invention is also constructed so that, when the aircraft cabin pressure is slightly greater than the ambient pressure, the actuation of the associated aircraft door latch assembly is locked out until the pressure vent door is opened enough to allow air to bleed out of the aircraft so that the cabin pressure can equalize to the ambient level.

The vent-latch interlock assembly of a preferred embodiment of this invention includes a pressure vent door (PVD) that is seated in an opening formed in the aircraft door to which the assembly is installed. The pressure vent door is rotationally attached to a PVD shaft that is itself rotationally attached to fittings secured to the aircraft door. More specifically, the pressure vent door rotates around lobes integral with the PVD shaft that are axially offset from the axis of the shaft and the associated fittings. A set of springs connected between the aircraft door and the pressure vent door imposes a force on the pressure vent door to bias it open. A drive rod provides a mechanical linkage between the PVD shaft and a latch assembly that controls the opening, closing, and locking of the aircraft door. A spring cartridge is fitted in line with the drive rod. In the event the ambient pressure is greater than the cabin pressure, the outside air will compress the cartridge to allow the pressure vent door to open. This allows air to bleed into the aircraft to minimize the stress on the aircraft fuselage.

The assembly of this invention also includes an interlock assembly that is connected between the pressure vent door and the aircraft door latch assembly. This assembly includes an interlock mechanism that is connected to the latch assembly and an interlock cable that is connected between the pressure vent door and the interlock mechanism. The interlock assembly is configured so that, as long as the pressure vent door is not fully open, the interlock mechanism locks out actuation of the latch assembly to prevent the aircraft door from being opened. The interlock assembly is also configured to prevent the pressure vent door from closing unless the aircraft door is properly latched and locked.

During the initial actuation of the latch assembly to open the aircraft door, the drive rod is pulled downward. The motion of the drive rod causes the PVD shaft to rotate. During normal conditions, the cabin pressure and the ambient pressure are approximately equal. The downward movement of the drive rod frees the pressure vent door to rotate with the PVD shaft in response to the force imposed by the springs. The opening of the pressure vent door actuates the interlock linkage so that the interlock mechanism frees the latch assembly so that, in turn, the aircraft door can be opened. In the event the aircraft cabin pressure is substantially greater than the ambient pressure, the springs are unable to overcome the cabin pressure. Consequently, the pressure vent door will be held closed. Because the interlock linkage does not move, the interlock mechanism locks out the continued actuation of the latch shaft; and thus, prevents the aircraft door from being opened.

If ice around the pressure vent door seals the door in position, the force of the springs may not provide sufficient force to pivot the pressure vent door open. In this situation, the rotation of the PVD shaft causes a translational movement of the pressure vent door due to a like translational displacement of the axially offset lobes on the PVD shaft. The movement of the pressure vent door breaks the door away from the ice so that the door can then be rotated open in the normal manner. If the cabin pressure is slightly greater than the ambient pressure, the cabin pressure will hold the pressure door shut during the initial actuation of the latch assembly. In this situation, though, the continued actuation of the latch assembly causes a downward force to be imposed on the interlock linkage. This force is transferred to the pressure vent door and causes it to rotate a small distance away from the aircraft door and partially open. Air in the aircraft cabin bleeds out of this opening to cause the cabin pressure to equalize with the ambient pressure. Once this occurs, the pressure vent door opens in the conventional manner to cause the unlocking of the latch assembly so that the aircraft door can be normally opened.

Thus, the vent-latch interlock assembly does more than provide a system for venting air into the aircraft cabin, preventing the opening of the aircraft door to which it is attached, and preventing the pressurization of the aircraft in the event the aircraft door is not properly latched and locked. The assembly of this invention also provides a means for breaking the pressure vent door away from any ice seal. The assembly further provides a means for bleeding air out of a slightly overpressured aircraft so that the aircraft door, once unlocked, will not be rapidly forced open.

BRIEF DESCRIPTION OF THE DRAWINGS

The invention will be pointed out with particularity in the appended claims. The above and further advantages of the invention may be better understood by reference to the following detailed description, taken in conjunction with the accompanying drawings in which:

DETAILED DESCRIPTION OF THE PREFERRED EMBODIMENT

Figure 1:
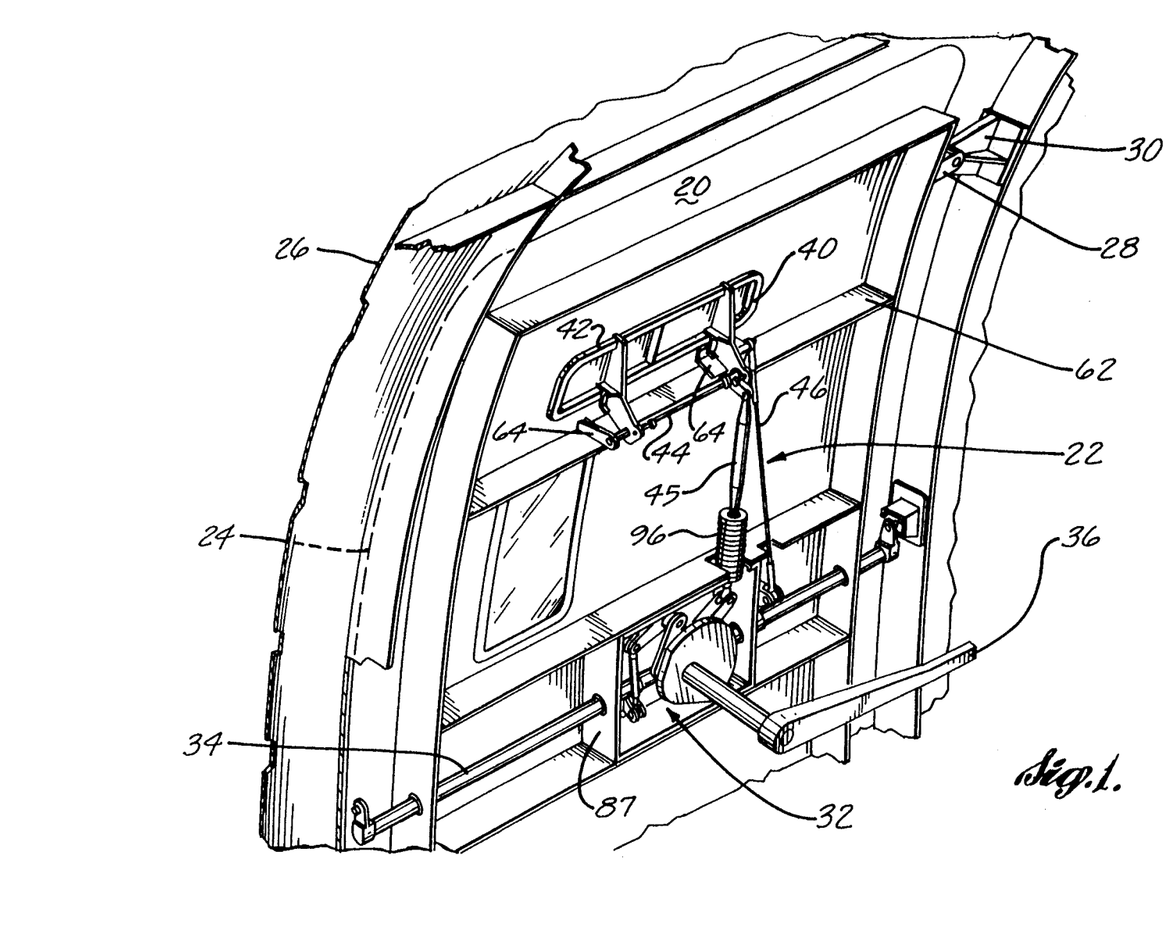
FIG. 1 is perspective view of an aircraft door to which a vent-interlock assembly of this invention is attached.

FIG. 1 illustrates a translating motion-type aircraft door 20 to which a vent-latch interlock assembly 22 of this invention is attached. The aircraft door 20 is seated in an opening 24 formed in an aircraft 26. A hinge, not illustrated, connects the aircraft door 20 to the aircraft 26 so that the door can be moved between the open and closed positions. The sides of the aircraft door 20 are provided with a number of outwardly extending doorstops 28, one shown. The aircraft 26 is provided with a number of body stops 30, one shown, that extend into the opening in which the aircraft door 20 is seated. When the aircraft 26 is in flight, the interior aircraft cabin pressure is higher than the ambient pressure. This pressure differential causes the air inside the cabin to urge the aircraft door 20 outward so that doorstops 28 abut the body stops 30 and seal the door shut. The opening, closing, and locking of the aircraft door 20 are controlled by a latch assembly 32. Latch assembly 32 includes a latch shaft 34 that lifts the aircraft door out of the opening and clear of the doorstops 28. A handle 36 controls the operation of the latch assembly 32. A description of one such latch assembly 32 is contained in U.S. Pat. No. 4,720,065, entitled "Translatable Outward Opening Plug-Type Aircraft Door and Actuating Mechanisms Therefore" issued in the name of Tomio Hamatani, assigned to the owner of this invention, and incorporated herein by reference.

Figure 2:
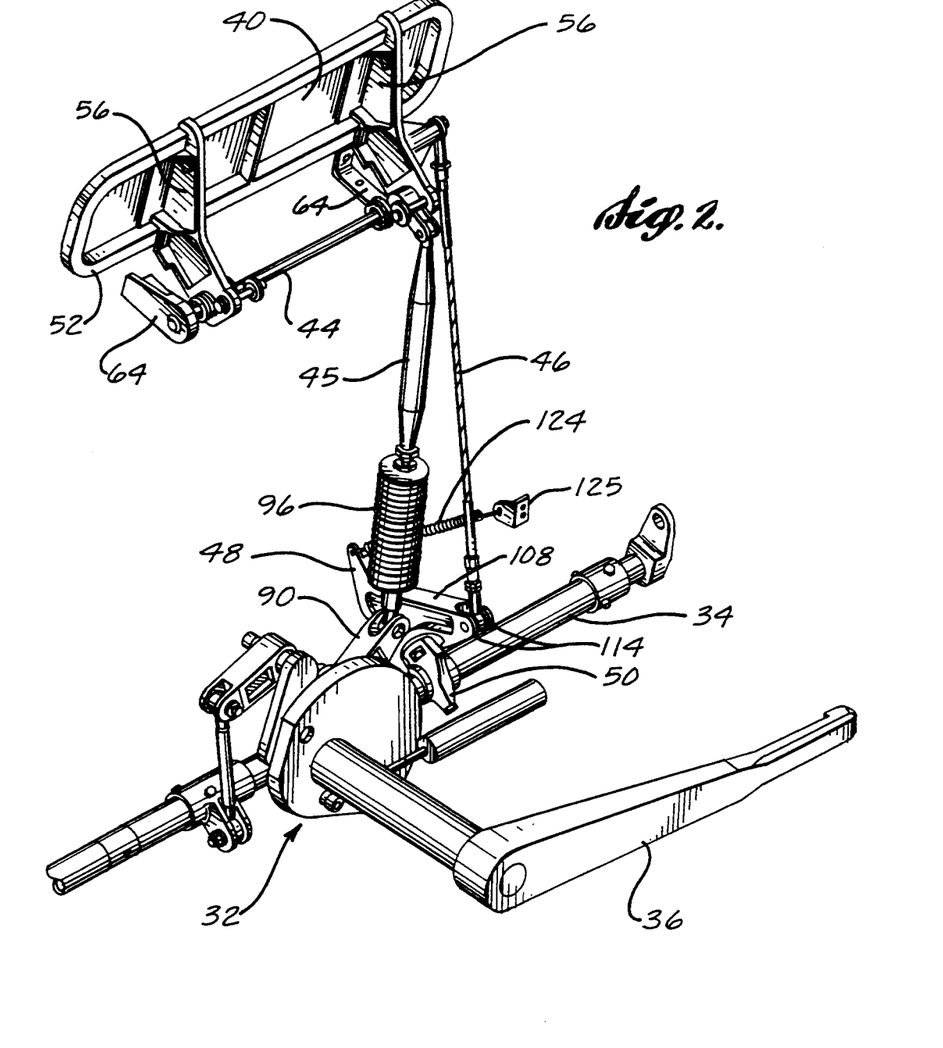
FIG. 2 is a perspective view of the vent-latch interlock assembly of the aircraft when viewed from inside the aircraft.

The vent-latch interlock assembly 22, as depicted in FIGS. 1 and 2, includes a pressure vent door (PVD) 40 that is normally seated in an opening 42 formed in the aircraft door 20. The pressure vent door 40 is rotationally attached to a PVD shaft 44 that is itself rotationally coupled to the aircraft door 20. A drive rod 45 provides a mechanical connection between the PVD shaft and the latch assembly 32. An interlock cable 46 extends between the pressure vent door 40 and the latch shaft 34. More particularly, the interlock cable 46 extends between pressure vent door 40 and an interlock follower 48 that is pivotally secured to the aircraft door 20. Interlock follower 48 selectively engages an interlock cam 50 that is attached to the latch shaft 34 to rotate in unison with the shaft.

The pressure vent door 40, as now described with reference to FIGS. 2, 3, and 4, has a generally rectangular appearance. A recessed lip 52 extends around the perimeter of the pressure vent door 40 and extends around the inside surface of the portion of the aircraft door 20 that defines the PVD opening 42. A seal 54 secured to the outer face of the lip 52 provides an airtight barrier between the aircraft cabin and the ambient environment. The pressure vent door 40 is secured to the PVD shaft 44 by a pair of inwardly directed hinge arms 56 formed integrally with the door. As depicted best by FIG. 4, the end of each hinge arm 56 is formed with an opening 58 that is fitted over a section of the PVD shaft 44. More specifically, each hinge arm 56 is fitted over a circular lobe 60, one shown, formed integrally with the PVD shaft 44. Lobes 60 have a circular profile, a diameter greater than that of the rest of the PVD shaft 44, are axially offset from the axis of the shaft, and are axially aligned with each other. The hinge arms 56 are provided with bearing assemblies, not illustrated, to ensure that the pressure vent door 40 can freely rotate relative to the PVD shaft 44.

The PVD shaft 44 is coupled to a pair of fittings 64 (FIG. 3) that are secured to a beam 62 that forms part of the frame of the aircraft door 20. The opposed ends of PVD shaft 44 are seated in openings 66 formed in the individual fittings 64. The fittings 64 may be provided with bearing assemblies, not illustrated, adjacent the openings 66 to ensure that the PVD shaft 44 can freely rotate. A pair of springs 68 extend between the aircraft door beam 62 and the PVD hinge arms 56. In the depicted version of the invention, springs 68 are located adjacent the surfaces of the individual PVD hinge arms 56 that face each other. Springs 68 are torsion springs that are disposed over PVD shaft 44 adjacent the PVD hinge arms 56. One end of each spring 68 is secured by a fastener 70 or other suitable component to the aircraft door beam 62. The other end of each spring 68 is formed with a hook 72 that is fitted over a pin 74 that extends outward from the adjacent PVD hinge arm 56. Springs 68 are secured to the aircraft door beam 62 and the PVD hinge arm 56 so that the springs urge the pressure vent door 40 to rotate open. Fasteners 75 secured to the ends of the pins 74 prevent the hooks 72 from slipping off the pins. The springs 68, or the PVD shaft 44, may be coated with plastic or other material, not shown, to reduce the noise that is produced when the pressure vent door 40 is displaced.

One end of the PVD shaft 44 is provided with a blade 78 that is positioned to abut a pin 80 integral with the adjacent PVD hinge arm 56. In the depicted version of the invention, pin 80 is coaxial with the pin 74 on the other side of the PVD hinge arm 56. In this version of the invention, pins 74 and 80 may be a single pin that extends through the PVD hinge arms 56. Blade 78 is integral with a sleeve 82 that is mounted to the PVD shaft 44 to rotate in unison with the shaft. A fastener 84 on the end of pin 80 prevents blade 78 from slipping away from the pin. A shaft spring 86 extends between the PVD shaft 44 and one of the PVD hinge arms 56. Shaft spring 86 is a torsion spring that is disposed over the PVD shaft 44 and the blade sleeve 82. One end of shaft spring 86 is secured to PVD shaft 44 by a fastener 83. The opposed end of shaft spring 86 is formed with a hook 89 that is fitted over a pin 85 that extends outward from the adjacent PVD hinge arm 56. A fastener 91 on the end of pin 85 secures the hook 89 in place. Shaft spring 86 is secured between PVD shaft 44 and PVD hinge arm 56 to impose an inward, opening, force on the pressure vent door 40 if there is a differential rotation between the PVD shaft 44 and the pressure vent door.

Figure 3:
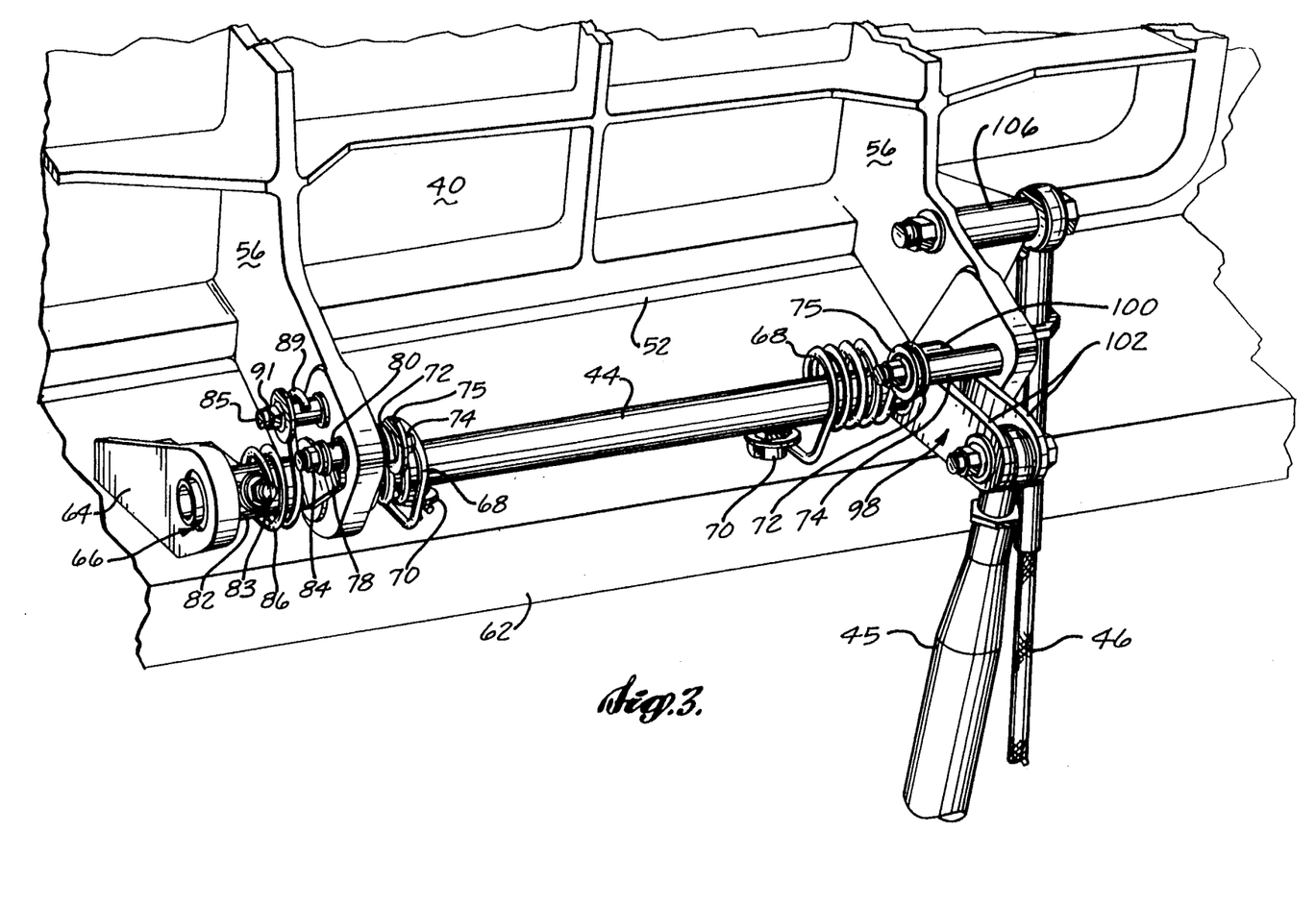
FIG. 3 is a detailed perspective view of the pressure vent door of the vent-latch interlock assembly of this invention.
Figure 4:
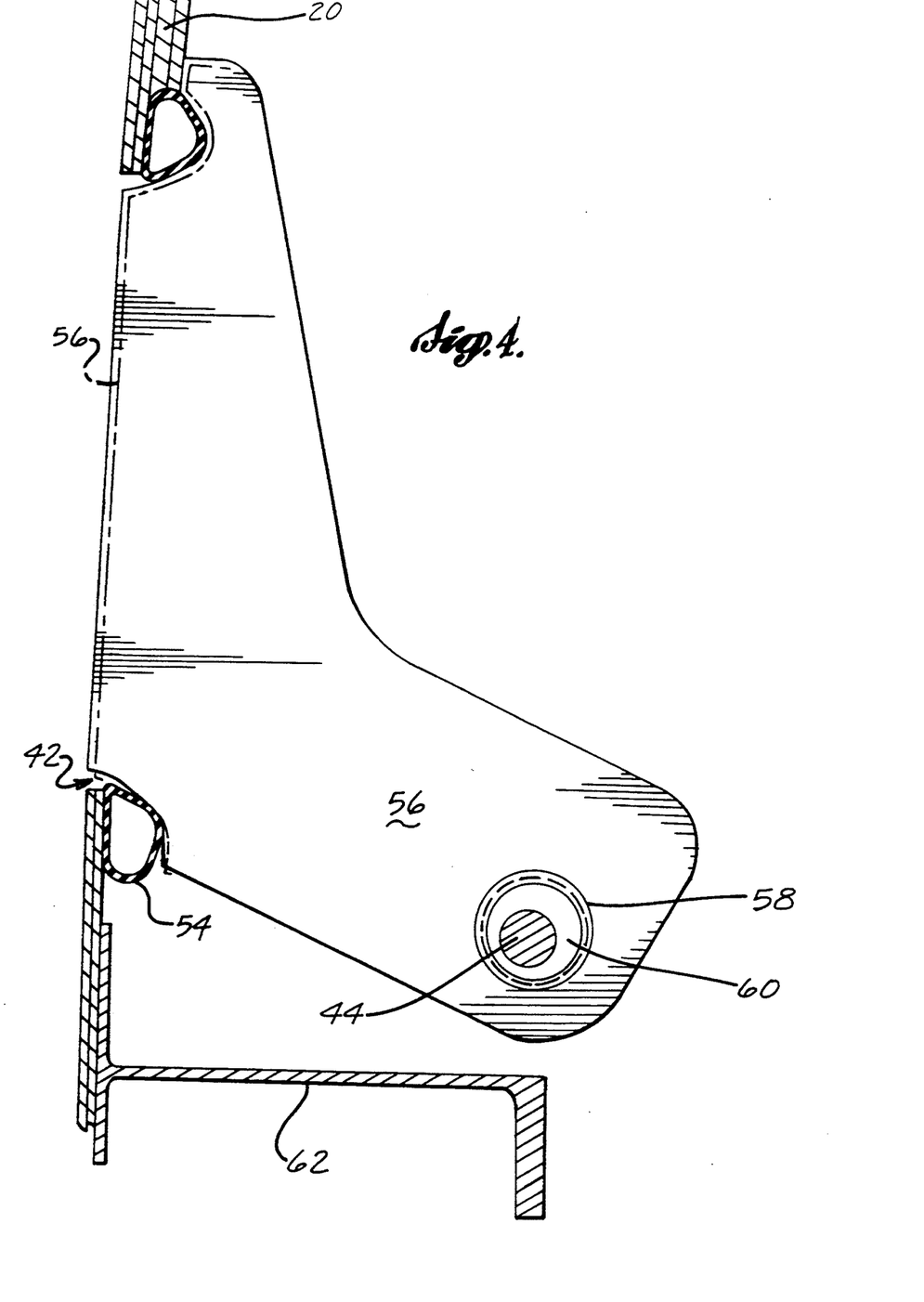
FIG. 4 is a plan view and partial cross-sectional view depicting the mounting of the pressure vent door to the pressure vent door shaft.
Figure 5:
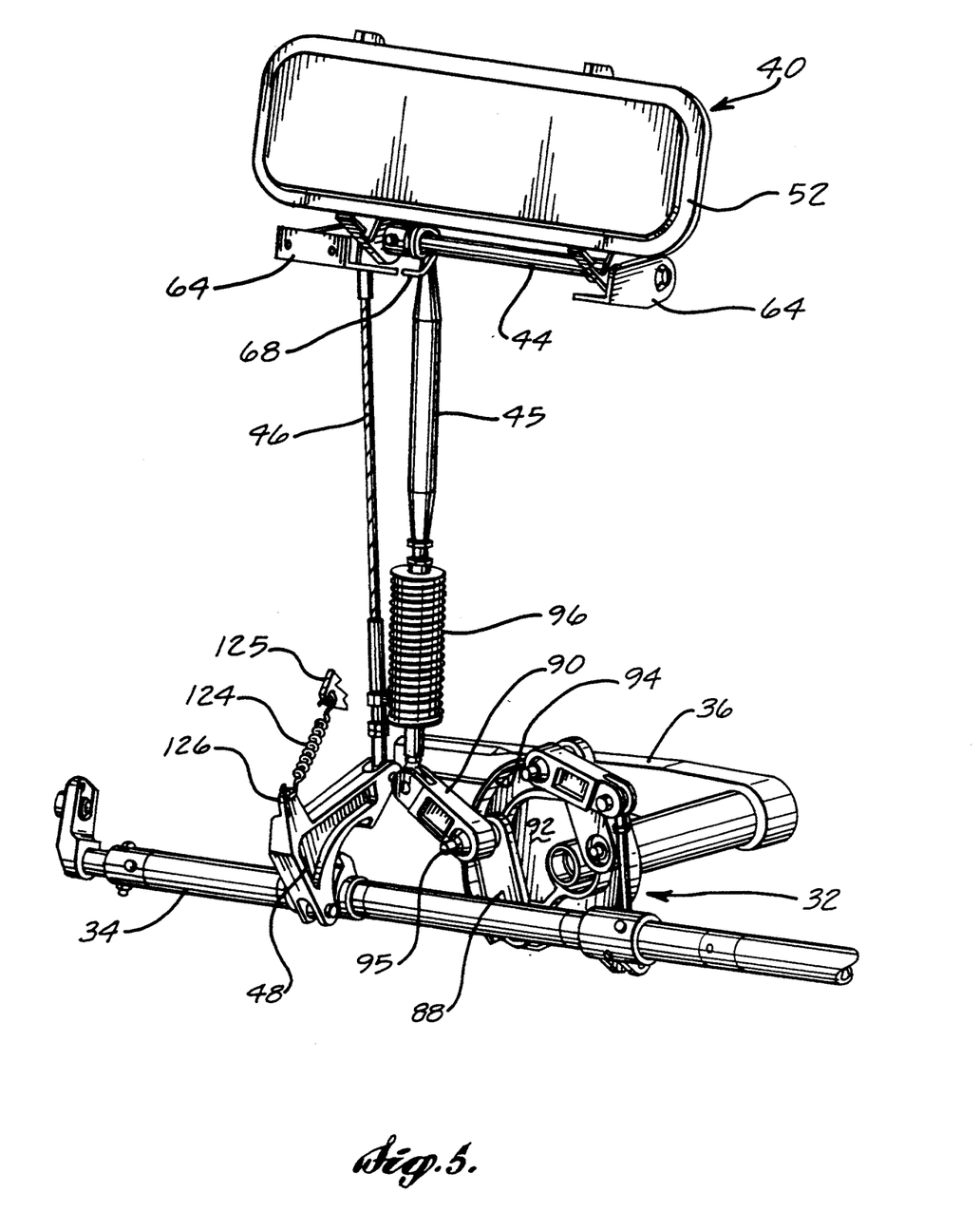
FIG. 5 is a perspective view of the vent-latch interlock assembly of this invention when viewed looking into the aircraft.

The drive rod 45, now described with respect to FIGS. 3 and 5, serves as the mechanical linkage that rotates the PVD shaft 44 in response to the actuation of the latch assembly 32. Drive rod 45 is connected to the latch assembly by a roller arm 88 and an idler crank 90. The roller arm 88 is mounted for rotation to a handle box 87, partially shown in FIG. 1, that is secured to the aircraft door 20. The free end of the roller arm 88 is coupled to a cam 92 that is part of the latch assembly 32. Cam 92 is secured to the latch handle 36 to rotate in unison with the handle. The end of roller arm 88 coupled to the cam 92 is provided with a roller bearing, not illustrated, that is seated in a cam track 94 formed in the cam 92. One end of idler crank 90 is secured to the roller arm 88 to move in unison therewith. In some preferred versions of the invention, roller arm 88 and idler crank 90 are both rotationally connected to a pin 95 that is mounted to the handle box 87. Roller arm 88 and idler crank 90 are both attached to pin 95 to move in unison with the pin. The end of idler crank 90 distal the end attached to the roller arm 88 is coupled to the lower end of drive rod 45. The connection between the drive rod 45 and the cam 92 is such that, when the latch handle 36 is actuated to open the aircraft door 20, the drive rod is lowered, and when the handle is actuated to close the door, the drive rod is raised.

Drive rod 45 includes an in-line spring cartridge assembly 96. The spring cartridge assembly 96 telescopes the drive rod 45 inward when excessive external pressure is imposed on the pressure vent door 40. The shortening of the drive rod 45 allows the pressure vent door 40 to rotate open so that air can bleed into the aircraft. This allows the cabin pressure to rise to a level near that of the ambient pressure. In some versions of the invention, the spring cartridge assembly 96 is configured to allow the pressure vent door 40 to partially open when the ambient pressure is approximately 0.3 psi greater than the cabin pressure, and by the time the pressure differential reaches 0.75 psi, the drive rod 45 will shorten a sufficient distance to allow the pressure vent door to fully open. The upper end of the drive rod 45 is connected to the PVD shaft 44 by a crank 98 as depicted by FIG. 3. Crank 98 has a body in the form of a tubular sleeve 100 that is fitted over the PVD shaft 44 to rotate in unison with the shaft. A pair of parallel arms 102 extend outward from the sleeve 100 and serve as the members to which drive rod 45 is connected. The crank 98 is positioned so that crank arms 102 are disposed underneath and normally contact one of the pins 74 that extend outward from the PVD hinge arm 56.

The interlock cable 46 is connected at its upper end to a pin 106 that is fixed to one of the PVD hinge arms 56. In the depicted version of the assembly 22, pin 106 is connected to the PVD hinge arm 56 adjacent the drive rod 45. The interlock cable 46 is a steel strand cable that has a diameter of approximately 5/16 inch. The lower end of the interlock cable 46 is connected to one end of the interlock follower 48 as seen by reference to FIGS. 2 and 6. Interlock cable 46 is provided with an in-line turnbuckle 107 that is adjusted to ensure that the cable is taut.

Figure 6:
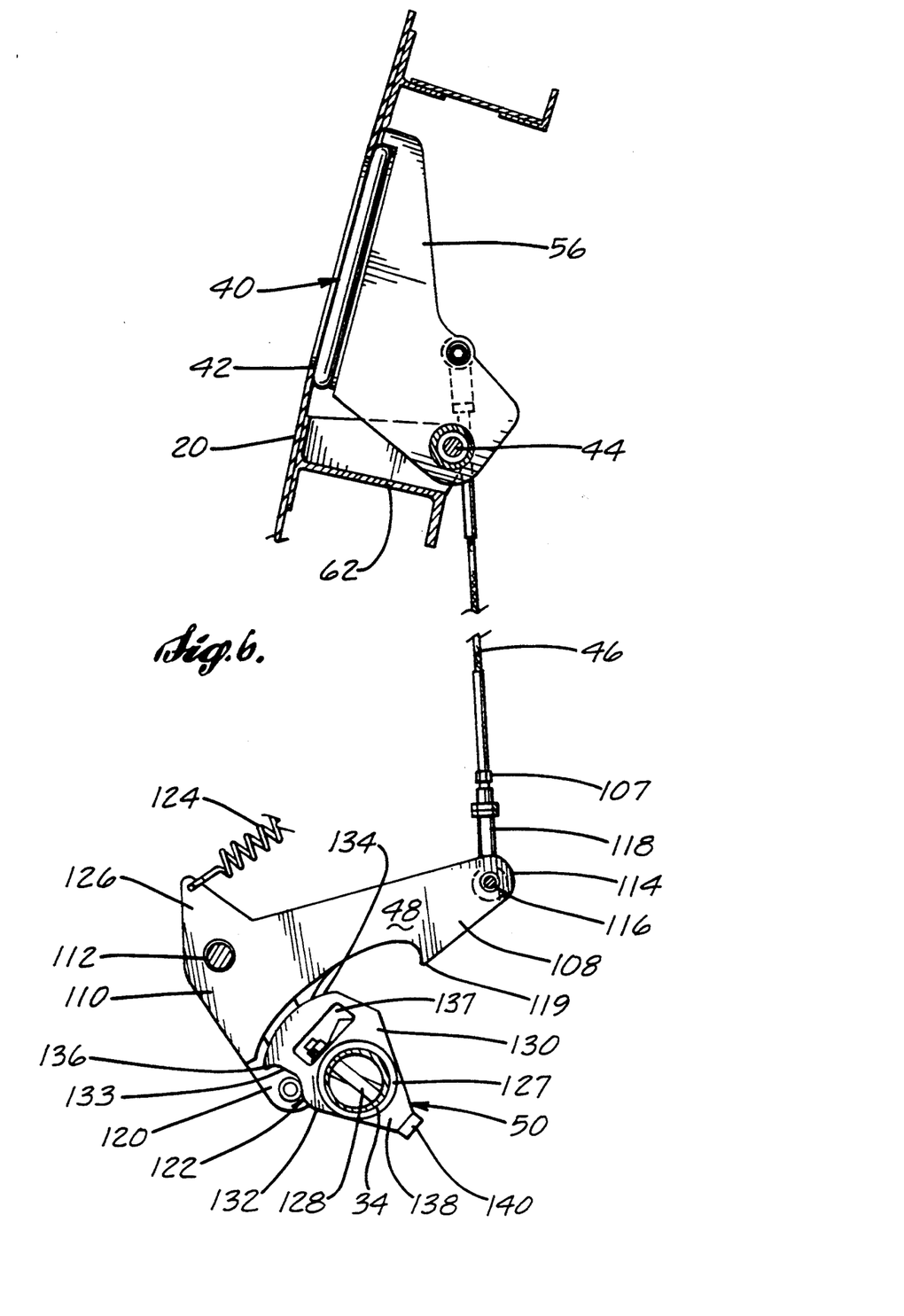
FIG. 6 is a side view of the interlock cable, the interlock follower, and the interlock cam of the vent-latch interlock assembly of this invention when the associated latch assembly is in the closed position.

The interlock follower 48 is formed out of an integral piece of metal and has first and second arms 108 and 110, respectively, that extend approximately 90° away from each other. The interlock follower 48 is pivotally mounted to aircraft door 20 adjacent the latch shaft 34. A lug 112, shown in cross section, formed with the follower 48 adjacent where the arms 108 and 110 meet, facilitates the mounting of the follower to a shaft, not illustrated, that is secured to the aircraft door 20. The lug 112 is rotationally mounted to the associated shaft so that the follower 48 can similarly rotate. The interlock follower first arm 108 extends generally inward from the aircraft door 20. The end of the arm 108 is formed with a clevis 114. The lower end of the interlock cable 46 is secured between the clevis 114 by a fastener 116 that extends through the clevis and a coupling 118 fitted to the end of the cable. The lower surface of the first arm 108 is formed with an outwardly directed hook 119, the purpose of which will be explained hereinafter.

The interlock follower second arm 110 extends downward relative to the first arm 108. The end of the second arm 110 is formed with a clevis 120, only one plate of which is illustrated. A roller bearing 122 is attached to the clevis 120 and positioned to abut the interlock cam 50. The position of the interlock follower 48 is biased by a spring 124. The spring 124 extends between a fitting 125 attached to the handle box 87 and a tab 126 that extends upward from the interlock follower first arm 108 adjacent the base of the follower. Spring 124 is positioned to impose a force on the interlock follower 48 that urges the first arm 108 downward and the second arm 110 outward so that the follower is normally disposed toward the latch shaft's unlocked position.

Interlock cam 50 includes a tubular base section 127 that is fitted over the latch shaft 34. The base section 127 is secured to the latch shaft by a pair of bolts 128, one shown, or other coupling means, so that the shaft and interlock cam 50 rotate in unison. A web 130 extends outward from the base section 127. Web 130 is shaped to have a dwell surface 132 that has a curved profile and is located adjacent the base section 127. A pressure ramp surface 133 extends linearly outward from the end of the dwell surface 132. The web 130 also has a hold-open surface 134 with a generally curved surface that is located adjacent the pressure ramp surface 133. Hold-open surface 134 has a greater radius than the radius of the dwell surface 132. Web 130 is further shaped to define a hook 136 at the location where the pressure ramp surface 133 and the hold-open surface 134 meet. In the illustrated embodiment of the invention, the web is formed with a cutout 137 adjacent the hold-open surface 134 to facilitate the instillation and removal of the fasteners 128. Web 130 is further formed with a generally triangular section 138 that extends away from the latch shaft 34 and that is located diametrically opposite the portion of the web that defines the hold-open surface 134. A stud 140 having a cylindrical profile is attached to the apex of the triangular web section 138.

When the vent-latch interlock assembly 22 is in a normal, closed state, the pressure vent door 40 is seated in the opening 42 formed in the aircraft door 20 to which the assembly is installed. The springs 68 exert a force on the PVD hinge arms 56 that urge the pressure vent door 40 inward. The inward, opening, movement of the pressure vent door 40 is, however, blocked by the crank arms 102, which block the movement of the adjacent hinge arm pin 74. When the pressure vent door 40 is in this state, the interlock cable 46 pulls the interlock follower 48 upward so that follower roller bearing 122 is held against the cam dwell surface 132.

During the normal mode of operation of the vent-latch interlock assembly 22, the aircraft cabin pressure is approximately the pressure of the ambient environment. When the aircraft is in this state and the latch assembly 32 is actuated to open the aircraft door 20, the rotation of the latch handle 36 causes a like rotation in the latch assembly cam 92. The rotation of cam 92 initially causes the roller arm 88 and idler crank 90 to pull the drive rod 45 downward. The downward movement of drive rod 45 results in like movement of the crank 98. The downward movement of the crank 98 frees the pressure vent door 40 so that it can open downward and inward in response to the force imposed by the springs 68. The opening of the pressure vent door 40 causes the interlock cable 46 to move downward. The movement of the interlock cable 46, in turn, frees spring 124 to rotate interlock follower 48 so that the roller bearing 122 is displaced away from the interlock cam 50. The movement of the roller bearing 122 away from the interlock cam 50 unlocks the latch shaft 34. Consequently, the latch shaft 34 is free to rotate so that the continued actuation of the handle 36 will result in the normal opening of the aircraft door 20.

In the event ice forms between the pressure vent door 40 and the adjacent portion of the aircraft door 20, the ice may form a seal that prevents the springs 68 from rotating the pressure vent door 40 open. When the aircraft door 20 is in this state, the downward movement of the drive rod 45 will cause the PVD shaft 44 to rotate. This movement of the PVD shaft 44 will cause a translational displacement of the axes of the shaft lobes 60 owing to their offset from the axis of the PVD shaft. Since the PVD hinge arms 56 are coupled to the PVD shaft lobes 60, the translational displacement of the lobes will cause a like downward and inward translational movement of the pressure vent door 40. This movement of the pressure vent door 40 breaks the door free of the ice so that the springs 68 can pivot the door inward in a conventional manner. Once this occurs, the interlock cable 46 moves downward to cause the interlock follower 48 to unlock from the latch shaft 34.

In the event the aircraft cabin pressure is significantly greater than the ambient pressure, for example, greater than 1.0 psi, the assembly 22 of this invention prevents the latch assembly 32 from being actuated to the point where the aircraft door 20 is open. When the aircraft is in this state, the cabin pressure of the aircraft 26 that urges the pressure vent door 40 against the aircraft door 20 is greater than the force that the springs 68 impose on the pressure vent door 40 to force it open. If the latch assembly 32 is actuated to open the aircraft door 20, the lowering of the drive rod 45 will not result in the normal opening of the pressure vent door 40. The interlock cable 46 does not move downward. The interlock follower roller bearing 122 will remain disposed against the dwell surface of the interlock cam 50. If there is continued actuation of the latch assembly 32, the latch shaft 34 will rotate until the pressure ramp surface 133 of the interlock cam 50 becomes caught against the interlock follower roller bearing 122. The force of the roller bearing 122 against the pressure ramp surface 133 prevents the further rotation of the latch shaft and the subsequent opening of the aircraft door 20.

The vent-latch interlock assembly 20 is also configured so that, if the aircraft cabin pressure is slightly greater than the ambient pressure, the latch assembly 32 will be blocked from actuation until the pressure vent door 40 is allowed to open enough to allow the cabin pressure to equalize to the ambient level. If the cabin pressure is slightly greater than the ambient pressure, for example, a differential between 0.15 and 0.23 psi, the outward force of the cabin pressure against the pressure vent door 40 may start to become greater than the inward force of the springs 68 that urge the door open. When this occurs, the differential rotation of the PVD shaft 44 and the pressure vent door 40 biases the shaft spring 86 so that the shaft spring 86 imposes an inward force against the pressure vent door 40. The force imposed by the shaft spring 86 in combination with the force normally imposed against the door 40 by springs 68 is enough to at least partially force the pressure vent door 40 away from the opening 42. Once the pressure vent door 40 is partially open, air bleeds out of the aircraft 26 lowering the cabin pressure so that the springs 68 and 86 will be able to pivot the pressure vent door 40 fully open.

Figure 7:
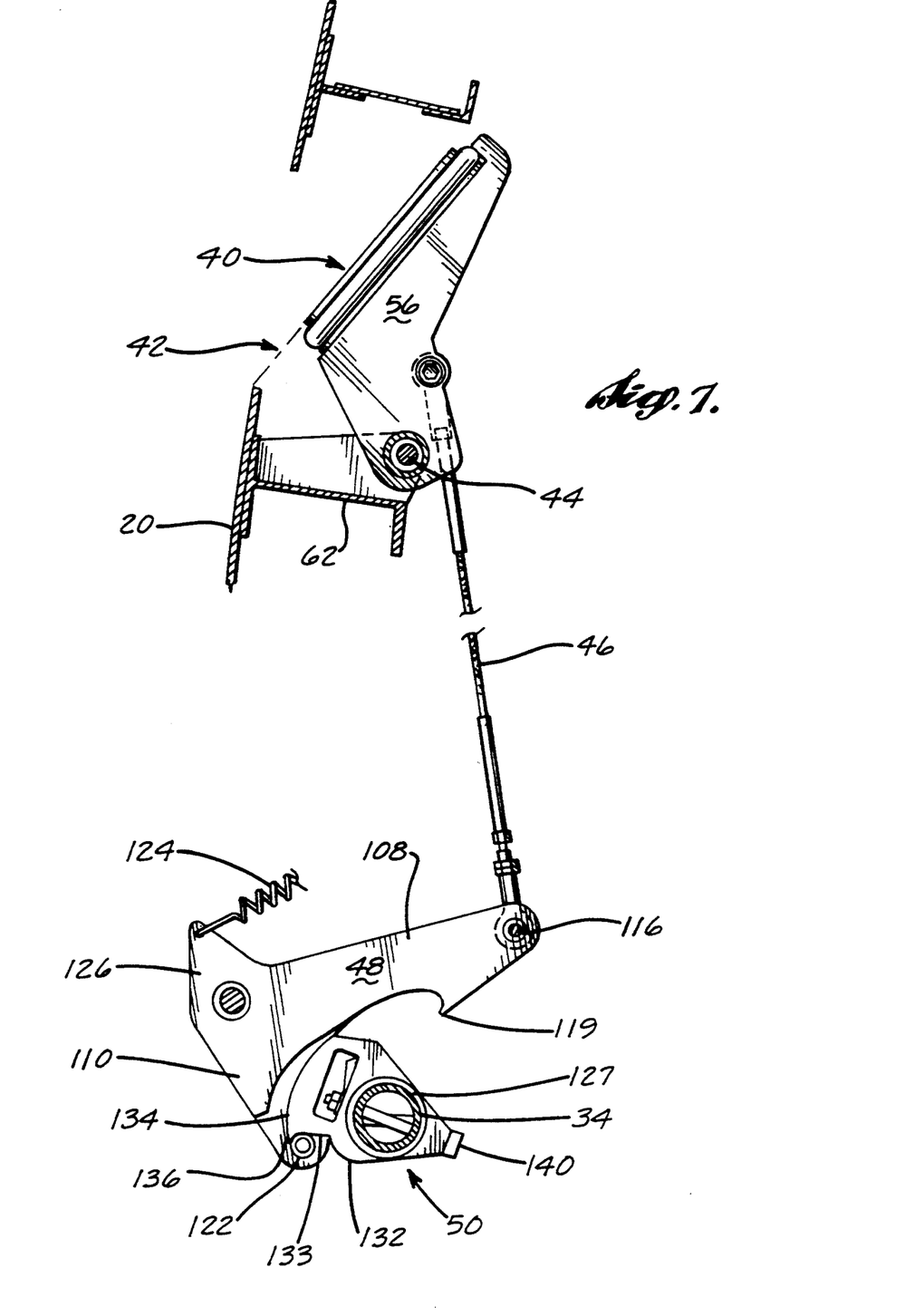
FIG. 7 is a view of the interlock cable, interlock follower, and interlock cam of FIG. 6 when the assembly of this invention is employed to open the pressure vent door due to the slight overpressurization of the aircraft cabin.

If there is a larger pressure differential between the aircraft cabin and the ambient environment, for example, if the cabin pressure is between 0.23 and 1.0 psi greater than the ambient pressure, the force exerted by springs 68 and 86 becomes insufficient to force the pressure vent door 40 open. When the aircraft 26 is in this state, the continued actuation of the latch assembly 32 causes the interlock follower bearing 122 to roll up the pressure ramp surface 133 and against the hook 136, as depicted in FIG. 7. This coupling prevents the latch shaft 34 from being rotated to the point where the aircraft door 20 is opened. The actuation of the latch assembly 32, however, induces a small rotation of the latch shaft 34 that, in turn, pulls the interlock follower 48 and interlock cable 46 downward. The downward force of the interlock cable 46 against the pressure vent door 40 overcomes the force of the air bearing against the door and pulls the door 40 partially open. Air bleeds out of the aircraft 26 through the small opening created between the pressure vent door 40 and the aircraft door 20. Once the pressure inside the aircraft 26 lowers, the springs 68 and 86 are able to exert enough force on the pressure vent door 40 so that the door fully opens. The full opening of the pressure vent door 40 causes the interlock cable 46 to move downward so that the interlock follower 48 unlocks from the latch shaft 34. The continued actuation of the latch assembly 32 then causes the normal opening of the aircraft door 20.

The vent-latch interlock assembly 22 of this invention thus has five modes of operation. In the normal mode of operation, assembly 22 unlocks the latch assembly 32 with which it is associated so that the latch assembly can be used to open the associated aircraft door 20. In the ice-breaking mode of operation, the pressure vent door 40 moves inward and downward to break free of ice that could be inhibiting the normal opening of the pressure vent door 40. When the cabin pressure is substantially greater than the ambient pressure, the pressure vent door 40 is held in place and prevents the actuation of the latch assembly 32 to the point where the aircraft door 20 is opened. This mode of operation stops the aircraft door 20 from being opened while the aircraft 26 is in flight. If the cabin pressure is slightly greater than the ambient pressure, the vent-latch interlock assembly 22 blocks the complete actuation of the latch assembly 32 until the pressure vent door 40 is allowed to open slightly so that air can bleed out of the aircraft 26. This prevents the aircraft door 20 from being opened in situations where a positive pressure inside the aircraft 26 could cause the door, once unlocked, to rapidly move outward. The spring cartridge 96 integral with the drive rod 45 allows the pressure vent door 40 to open in the event that the ambient pressure is significantly greater than that inside the aircraft. This mode of operation minimizes the external pressure imposed on the aircraft 26.

Still another feature of the vent-latch interlock assembly 22 of this invention is that, when operated in the ice-breaking mode, the pressure vent door 40 moves longitudinally relative to the plane of the ice. Since ice is typically weakest in shear, the translational movement of the pressure vent door 40 causes the door to rapidly break free of the ice. This feature of the invention reduces the time it takes for the pressure vent door to open normally to, in turn, minimize the amount of time it takes to open the aircraft door 20. Moreover, in the event the ice forms an adhesive seal between the seal 54 integral with the pressure vent door 40 and the adjacent skin of the aircraft door 20, the downward pulling action of the interlock cable 46 breaks the pressure vent door 40 away from the aircraft door 20.

When the aircraft door 20 is closed in normal operation, the actuation of the latch assembly 32 induces an upward movement in the drive rod 45. The upward movement of the drive rod 45 causes a like movement in the crank arms 102 against the adjacent PVD bracket pin 74. The force of the crank arms 102 against the PVD bracket pin 74 rotates the pressure vent door 40 and the PVD shaft 44 to return the door to its closed position. The displacement of the crank 98 also causes the PVD shaft 44 to rotate so that blade 78 undergoes a like upward movement with the crank. The blade 78 pushes against the adjacent PVD bracket pin 80 to provide a second force for driving the pressure vent door 40. An advantage of this feature of the invention is that, since the blade 78 and crank 98 push against the pressure vent door 40 at two spaced-apart locations, the pressure vent door compresses the seal 54 equally.

Another feature of this vent-latch interlock assembly 22 is that, during the normal closing of the aircraft door 20, since there is no differential rotation between the PVD shaft 44 and the pressure vent door 40, the biasing force of shaft spring 86 does not affect the handle forces. Consequently, when the latch assembly 32 is actuated to close the pressure vent door 40, the shaft spring 86 does not impose a load that opposes the closing of the door. This feature of the invention reduces the amount of force the person closing the aircraft door 20 has to apply when actuating the latch assembly 32 in order to get the pressure vent door 40 to close.

Figure 8:
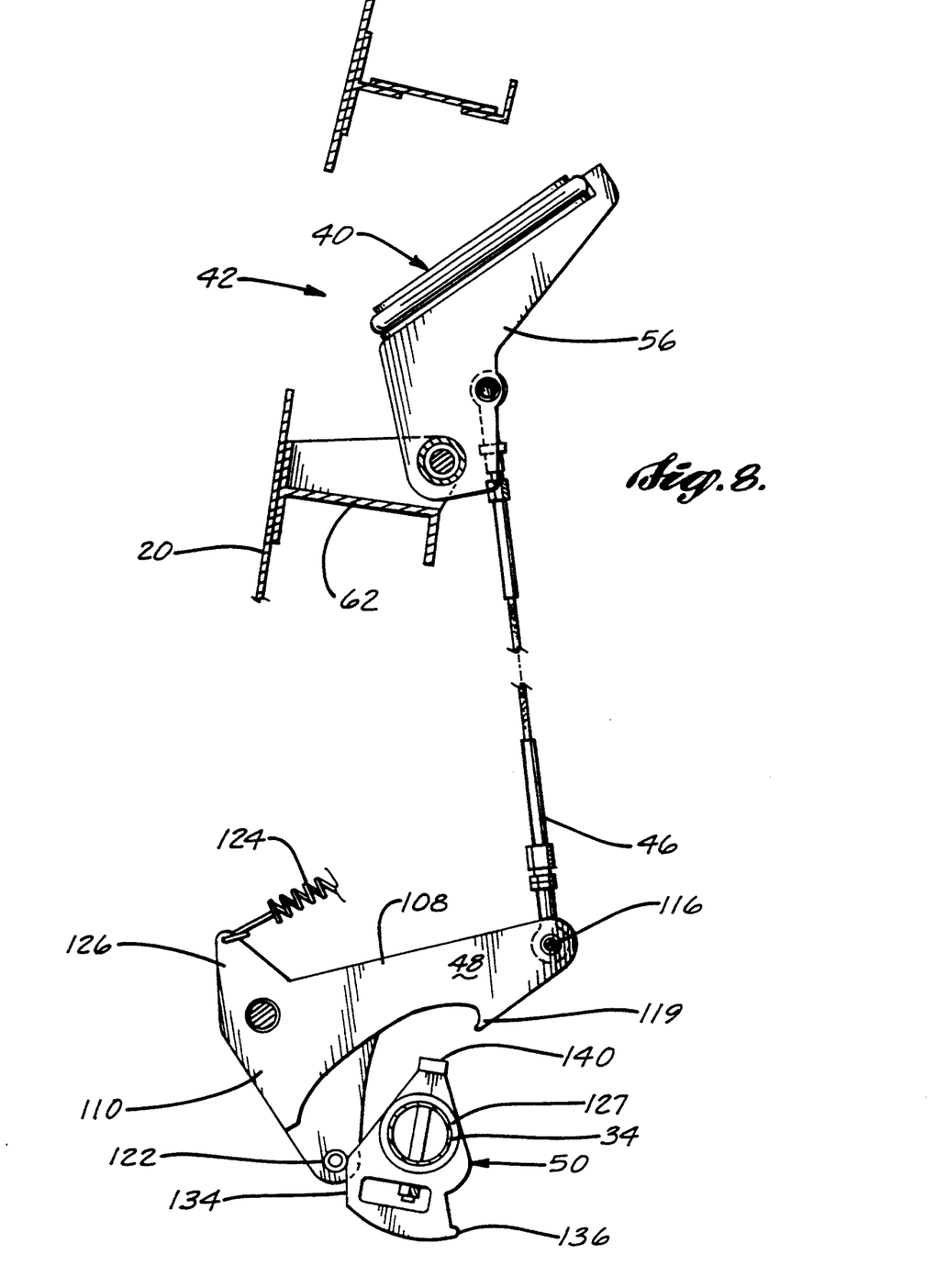
FIG. 8 is a view of the interlock cable, interlock follower, and interlock cam of FIG. 6 when the associated latch assembly is in the open position.

Vent-latch interlock assembly 22 is also designed to provide an indication of a failure of the latch assembly 32. During the normal closing of the aircraft door 20, the latch shaft 34 will rotate to cause a like motion in the interlock cam 50. The closing of the pressure vent door 40 will impose a tension in the interlock cable 46 that results in the interlock follower roller bearing 122 being urged against the dwell surface 132 of the interlock follower 48. In the event the latch assembly 32 fails, the latch shaft 34 will not rotate even if the latch handle 36 is completely actuated. When this occurs, the drive rod 45 will push the pressure vent door 40 toward the closed position, as during the normal closing of the door. The movement of the pressure vent will impose a tension on the interlock cable 46 that causes the interlock follower 48 to pivot. However, as depicted by FIG. 8, since the latch shaft 34 has not moved, the interlock cam 50 similarly remains in the static, aircraft door 20-open position. When the interlock cam 50 is in this state, the interlock follower roller bearing 122 will bear against the hold-open surface 134 of the interlock cam and continued movement of the interlock follower 48 is blocked. The lockout of the interlock follower 48 prevents the upward movement of the interlock cable 46 that allows the pressure vent door 40 to close. Any attempts to pressure the aircraft 26 will fail since the pressure vent door 40 is held open by the interlock cable 46. The inability to pressurize the aircraft will serve as an indication that there is a problem that requires rectification.

The vent-latch interlock assembly 22 of this invention is further configured to provide an indication that either the drive rod 45 or interlock cable 46 has failed. During the normal opening and closing of the aircraft door 20, the hook 119 integral with the interlock follower 48 is spaced away from the interlock cam 50. If the drive rod 45 fails or separates from the other components of the assembly 22, the springs 68 will force the pressure vent door 40 open beyond the point to which it is normally opened. The movement of the pressure vent door 40 causes the interlock cable 46 to lower beyond normal. This movement results in the extreme pivoting of the interlock follower 48. The movement of the interlock follower 48 results in the lowering of the follower first arm 108 to the level where the hook 119 is adjacent the stud 140 on the end of the interlock cam 50. When the latch shaft 34 is rotated to close the aircraft door 20, the stud 140 abuts the hook 119 to prevent further actuation of the latch shaft 34 and the closing of the aircraft door 20. If the interlock cable 46 fails, or if the cable separates from the other components of the assembly 22, the force of the spring 124 will similarly pivot the interlock follower 48 to the point where the hook 119 is adjacent the stud 140. Personnel actuating the latch assembly 32 to close the door 20 will again find the movement of the latch shaft 34 blocked. The stoppage of this motion and the inability to continue closing the aircraft door 20 serve as an indication that there is a situation that requires attention.

The vent-latch interlock assembly 22 of this invention thus serves a number of functions. It allows the aircraft door 20 to be normally opened, prevents its opening when the aircraft is significantly pressurized, and blocks its opening when the aircraft is slightly pressurized until the cabin pressure is bled to ambient levels. The assembly 22 operates even if there is ice on the outside of the aircraft door 20 to which it is attached. The assembly 22 also is designed to provide an indication of the failures of both its internal components and the latch assembly 32 with which it is integral. Furthermore, still another feature of this assembly 22 is that it is designed out of relatively few components.

The foregoing description has been limited to a specific embodiment of the invention. It will be apparent, however, that changes and variations to the construction of the invention can be made without departing from the scope of the claims. For example, it is not necessary that in each and every embodiment of the invention the drive rod 45 include the in-line spring cartridge 96 to provide a negative venting of air into the aircraft. Furthermore, other mechanisms in the drive rod 45 may be employed to open and close the pressure vent door 40. Similarly, other mechanisms in the cable employ a linkage member between the pressure vent and the associated interlocking members attached to the latch assembly 32. For example, in some versions of the invention the interlock linkage may be in the form of a rigid rod. The springs 68 used to bias the pressure vent door 40 open may similarly be replaced and/or located in another position relative to the aircraft door 20 and the pressure vent door 40. It should also be appreciated that the opening in which the pressure vent door is seated need not always be wholly located within the associated aircraft door 20. In some versions of the invention the opening may actually be a cutout formed along the outer perimeter of the aircraft door 20. In still other versions of the invention, the pressure vent door may actually be a gate that is attached to the perimeter of the aircraft door 20. In these versions of the invention it should be understood that the pressure vent door 40, when closed, is located between the aircraft door 20 and the adjacent skin of the aircraft 26.

It should similarly be understood that, while the vent-latch interlock assembly 20 of this invention is described as being attached to an aircraft door 20 with a translational motion-type door and complementary latch assembly, there is no requirement that all such versions of this invention be used with that type of door. The invention can be employed with other aircraft doors and aircraft door latch assemblies. In some versions of this embodiment of the invention, the interlock cam is attached to any moving member of the latch assembly that controls the opening and closing of the associated aircraft door. The interlock follower is attached to the aircraft door adjacent the interlock follower so that the two components can selectively cooperate to prevent actuation of the latch assembly and/or the closing of the pressure vent door. Other versions of the vent-latch interlock assembly 22 may be used with latch assemblies that include motor-driven components that control the opening, closing, and locking of the aircraft door. In these versions of the invention, the interlock portions of the assembly, instead of being associated with the moving mechanical members, may be associated with one or more relays that control the actuation of the motors. Moreover, the drive rods of these versions of the invention may, themselves, be actuated by motors associated with the latch assemblies with which they are integral. In a similar vein, it should be recognized that, while the invention is described for use with the cabin door of an aircraft, its application is not so limited. The pressure vent door assembly 22 of this invention may be installed on another pressure lock door of an aircraft. For example, it may be desirable to attach versions of this invention to the cargo doors of the aircraft. These versions of the invention can be constructed so that the pressure vent door will not close until the associated cargo door is properly latched and locked and so that upon the landing of the aircraft and the opening of the cargo door, the pressure vent door will break free of any ice that may be holding it in place. Therefore, it is the object of the appended claims to cover all such variations and modifications as come within the true spirit and scope of the invention.

The embodiments of the invention in which an exclusive property or privilege is claimed are defined as follows:

1. A vent-latch interlock assembly for attachment to an aircraft door having a selectively actuatable latch assembly for opening and closing the aircraft door, said vent-latch interlock assembly comprising:

a pressure vent door attached to the aircraft door, said pressure vent door being positioned adjacent an opening formed in the aircraft door and being adjustably secured to the aircraft door to move between a closed position seated in the aircraft door opening and a fully open position spaced from the aircraft door opening;

biasing means connected between the aircraft door and said pressure vent door for urging said pressure vent door toward said fully open position;

a drive linkage connected between the latch assembly and said pressure vent door, for selectively maintaining said pressure vent door in said closed position, said drive linkage being movable between a first position for maintaining said pressure vent door in said closed position when the aircraft door is closed and a second position for allowing said pressure vent door to move toward said fully open position when the latch assembly is actuated to open the aircraft door; and an interlock assembly connected between the latch assembly and said pressure vent door for controlling the actuation of the latch assembly in response to said position of said pressure vent door, said interlock assembly having a first position abutting the latch assembly for preventing actuation of the latch assembly to open the aircraft door when said pressure vent door is in said closed position and a second position spaced from the latch assembly for allowing actuation of the latch assembly when said pressure vent door is in said open position.

2. The vent-latch interlock assembly of claim 1, further including an ice-breaking mechanism integral with said pressure vent door for breaking said pressure vent door free from the aircraft door opening when said pressure vent door is in said closed position.

3. The vent-latch interlock assembly of claim 1, wherein said interlock assembly is further configured to urge said pressure vent door from said closed position to a partially opened position when said interlock assembly is in said first position.

4. The vent-latch interlock assembly of claim 3, further including an ice-breaking mechanism integral with said pressure vent door for breaking said pressure vent door free from the aircraft door opening when said pressure vent door is in said closed position.

5. The vent-latch interlock assembly of claim 1, further including:

a pressure vent door shaft rotationally attached to the aircraft door, said pressure vent door shaft having an axis and including at least one lobe integral with said shaft, said at least one lobe having an axis offset from said axis of said pressure vent door shaft, and, wherein:

said pressure vent door is rotationally secured to said at least one lobe of said pressure vent door; and said drive linkage is connected to said pressure vent door shaft for rotating said pressure vent door shaft as said drive linkage moves between said first position and said second position.

6. The vent-latch interlock assembly of claim 5, further including a shaft spring extending between said pressure vent door shaft and said pressure vent door, said shaft spring being configured to bias said pressure vent door toward said fully opened position when said pressure vent door shaft is rotated and said pressure vent door is in said closed position.

7. The vent-latch interlock assembly of claim 1, wherein said interlock assembly includes:

an interlock follower connected to the aircraft door adjacent the latch assembly, said interlock follower having a first position against said latch assembly for preventing the actuation of the latch assembly to open the aircraft door and a second position spaced from the latch assembly for allowing the actuation of the latch assembly; and an interlock linkage connected between said interlock follower and said pressure vent door, said interlock linkage being movable between a first position for maintaining said interlock follower against the latch assembly when said pressure vent door is closed and a second position for displacing said interlock follower away from said latch assembly when said pressure vent door is in said fully open position.

8. The vent-latch interlock assembly of claim 7, wherein said interlock assembly further includes an interlock cam attached to said latch assembly to move in unison with the latch assembly, said interlock cam being positioned to abut said interlock follower when said interlock follower is in said first position.

9. The vent-latch interlock assembly of claim 7, wherein:

said latch assembly further includes a first coupling member attached to the latch assembly and a second coupling member on said interlock follower, said first and second coupling members being positioned to abut one another when said interlock follower is in said first position and further positioned to cause a partial displacement of said interlock follower when the latch assembly is actuated and said interlock follower is in said first position and, wherein:

said interlock linkage is connected to said pressure vent door to urge said pressure vent door from said closed position to a partially open position when said interlock follower is displaced from said first position in response to the actuation of the latch shaft.

10. The vent-latch interlock assembly of claim 9, wherein said first coupling member of said interlock assembly is a cam attached to the latch assembly to move in unison with the latch assembly, said cam being positioned to abut said second coupling member of said interlock follower and being shaped so that, when said interlock follower is in said first position, said cam displaces said interlock follower from said first position and blocks actuation of the latch assembly to open the aircraft door.

11. The vent-latch interlock assembly of claim 7, further including:

a pressure vent door shaft rotationally attached to the aircraft door, said pressure vent door shaft having an axis and including at least one lobe integral with said shaft, said at least one lobe having an axis offset from said axis of said pressure vent door shaft and wherein:

said pressure vent door is rotationally secured to said at least one lobe of said pressure vent door; and said drive linkage is connected to said pressure vent door shaft for rotating said pressure vent door shaft as said drive linkage moves between said first position and said second position.

12. An aircraft door assembly for placement in an opening formed in an aircraft comprising:

an aircraft door dimensioned to be fitted in the opening in the fuselage of the aircraft, said aircraft door being formed with a pressure vent door opening;

a latch assembly attached to said aircraft door and selectively coupled to the aircraft for opening and closing the aircraft door, said latch assembly including a means for controlling the opening of said aircraft door;

a pressure vent door attached to said aircraft door, said pressure vent door being positioned adjacent said pressure vent door opening and being adjustably secured to the aircraft door to move between a closed position seated in said pressure vent door opening and a fully opened position spaced away from said pressure vent door opening;

a drive assembly connected between said latch assembly and said pressure vent door for controlling said position of said pressure vent door, said drive assembly being movable between a first position locking said pressure vent door in said closed position when said aircraft door is closed and a second position urging said pressure vent door toward said fully opened position when said latch assembly is actuated to open said aircraft door; and an interlock assembly connected between said latch assembly and said pressure vent door, said interlock assembly being movable between a position engaging said means for controlling said actuation of said latch assembly to prevent actuation of said latch assembly to open said aircraft door when said pressure vent door is in said closed position and a position spaced from said means for controlling said actuation of said latch assembly when said pressure vent door is in said fully opened position.

13. The aircraft door assembly of claim 12, wherein said drive assembly includes:

a biasing member connected between said aircraft door and said pressure vent door for urging said pressure vent door toward said fully open position; and a drive linkage connected between said latch assembly and said pressure vent door, said drive linkage being movable between a first position holding said pressure vent door in said closed position and a second position releasing said hold on said pressure vent door when the latch assembly is actuated to open the aircraft door wherein said drive linkage moves between said first position and said second position in response to the actuation of said latch assembly to open said aircraft door.

14. The aircraft door assembly of claim 12, further including an ice-breaking mechanism integral with said drive assembly for displacing said pressure vent door away from said pressure vent door opening in response to movement of said drive assembly to said second position.

15. The aircraft door assembly of claim 12, wherein said interlock assembly includes a linkage connected between said latch assembly and said pressure vent door for urging said pressure vent door from said closed position to a partially opened position spaced from said pressure vent door opening, said interlock linkage being configured to urge said pressure vent door toward said partially open position when said interlock assembly prevents actuation of said latch assembly to open said aircraft door.

16. The aircraft door assembly of claim 15, further including an ice-breaking mechanism integral with said drive assembly for displacing said pressure vent door away from said pressure vent door opening in response to movement of said drive assembly to said second position.

17. The aircraft door assembly of claim 12, wherein:
said latch assembly is a manually powered assembly for opening, closing, and locking said aircraft door, and said means for controlling said opening of said aircraft door is a movable member of said latch assembly; and
said interlock assembly is connected to said latch assembly for selectively engaging said movable member of said latch assembly when said pressure vent door is in said closed position to prevent actuation of said latch assembly to open said aircraft door.

18. The aircraft door assembly of claim 17, wherein said aircraft door is a translating motion-type aircraft door.

19. The aircraft door assembly of claim 18, wherein said movable member of said latch assembly is a latch shaft, said latch shaft being positioned to move said aircraft door in and out of the opening in the aircraft.

20. The aircraft door assembly of claim 12, wherein said pressure vent door opening is located wholly within said aircraft door.

21. A vent-latch interlock assembly for attachment to an aircraft door having a selectively actuatable latch assembly for opening, closing, and locking the aircraft door, said vent-latch interlock assembly comprising:

a pressure vent door attached to the aircraft door, said pressure vent door being positioned adjacent an opening formed in the aircraft door and being adjustably secured to the aircraft door to move between a closed position seated in the aircraft door opening and a fully opened positioned spaced away from the aircraft door opening;

a drive assembly connected between the latch assembly and said pressure vent door for controlling said position of said pressure vent door, said drive assembly being movable between a first position locking said pressure vent door in said closed position when the aircraft door is closed and a second position urging said pressure vent door toward said fully opened position when the latch assembly is actuated to open the aircraft door; and an interlock assembly including an interlock follower connected to the aircraft door for selectively engaging said latch assembly to prevent the opening of the aircraft door, and an interlock linkage connected between said interlock follower and said pressure vent door wherein said interlock linkage engages said interlock follower with the latch assembly when said pressure vent door is in said closed position, disengages said interlock follower from the latch assembly when said pressure vent door is in said fully opened position, and urges said pressure vent door away from the opening in the aircraft door when said interlock follower is engaged with the latch assembly and the latch assembly is actuated to open the aircraft door.

22. The vent-latch interlock assembly of claim 21, wherein said drive assembly includes:

a biasing member connected between the aircraft door and said pressure vent door for urging said pressure vent door toward said fully open position; and a drive linkage connected between the latch assembly and said pressure vent door, said drive linkage being movable between a first position holding said pressure vent door in said closed position and a second position releasing said hold on said pressure vent door when the latch assembly is actuated to open the aircraft door, wherein said drive linkage moves between said first position and said second position in response to the actuation of the latch assembly to open the aircraft door.

23. The vent-latch interlock assembly of claim 21, further including a stud attached to the latch assembly; a catch on said interlock follower adjacent said stud, wherein said interlock follower is selectively positionable so that said catch on said interlock follower engages said stud to prevent actuation of the latch assembly to close the aircraft door.

24. The vent-latch interlock assembly of claim 21, wherein said interlock follower engages the latch assembly to cause said interlock linkage to hold said pressure vent door in an open position spaced from the opening in the aircraft door until the latch assembly closes the aircraft door.

25. The vent-latch interlock assembly of claim 24, further including a stud attached to the latch assembly; a catch on said interlock follower adjacent said stud, wherein said interlock follower is selectively positionable so that said catch on said interlock follower engages said stud to prevent actuation of the latch assembly to close the aircraft door.

26. The vent-latch interlock assembly of claim 25, further including:
- a cam attached to a portion of the latch assembly to move in unison with the latch assembly, said cam having a first surface for engaging said interlock follower to prevent actuation of the latch assembly to open the aircraft door and a second surface for engaging said interlock follower to maintain said pressure vent door in said open position, and wherein said stud is attached to said cam.

27. The vent-latch interlock assembly of claim 26, wherein said first surface of said cam for engaging said interlock follower defines a hook integral with said cam.

28. The vent latch interlock assembly of claim 21, wherein said opening in the aircraft door in which said pressure vent door is seated is located wholly within the aircraft door.

29. An aircraft door assembly for placement in an opening formed in an aircraft comprising:
- an aircraft door dimensioned to be fitted in the opening in the fuselage of the aircraft, said aircraft door being formed with a pressure vent door opening;
- a latch assembly attached to said aircraft door and selectively coupled to the aircraft for opening and closing the aircraft door, said latch assembly including a means for controlling the opening, closing, and locking of said aircraft door;
- a pressure vent door attached to said aircraft door, said pressure vent door being positioned adjacent said pressure vent door opening and being adjustably secured to the aircraft door to move between a closed position seated in said pressure vent door opening and a fully opened position spaced away from said pressure vent door opening;
- a drive assembly connected between said latch assembly and said pressure vent door for controlling said position of said pressure vent door, said drive assembly being movable between a first position locking said pressure vent door in said closed position when said latch assembly is actuated to close said aircraft door and a second position urging said pressure vent door toward said opened position when said latch assembly is actuated to open said aircraft door; and
- an interlock assembly connected between said latch assembly and said pressure vent door, said interlock assembly being movable between a first position for preventing movement of said pressure vent door from said open position to said closed position when said latch assembly maintains said aircraft door in an open state and a second position for allowing said pressure vent door to move from said open position to said closed position when said latch assembly locks said aircraft door.

30. The aircraft door assembly of claim 29, wherein said pressure vent door is formed wholly in said aircraft door.

31. The aircraft door assembly of claim 29, wherein said aircraft door is a aircraft cabin door.

32. The aircraft door assembly of claim 31, wherein said pressure vent door is formed wholly in said aircraft cabin door.

* * * * *

UNITED STATES PATENT AND TRADEMARK OFFICE
CERTIFICATE OF CORRECTION

PATENT NO. : 5,337,977
DATED : August 16, 1994
INVENTOR(S) : M.A. Fleming et al.

It is certified that error appears in the above-identified patent and that said Letters Patent is hereby corrected as shown below:

| COLUMN | LINE | |
|---|---|---|
| 2 | 4 | "three" should read --force-- |
| 16 (Claim 21, | 20 Line 10) | "positioned" should read --position-- |

Signed and Sealed this

Tenth Day of January, 1995

Attest:

BRUCE LEHMAN

Attesting Officer     Commissioner of Patents and Trademarks